United States Patent
Todorovic

(10) Patent No.: US 9,719,421 B2
(45) Date of Patent: Aug. 1, 2017

(54) GAS-TURBINE ENGINE WITH TELESCOPE-TYPE AIR INLET OF THE ENGINE COWLING (NACELLE)

(75) Inventor: Predrag Todorovic, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 798 days.

(21) Appl. No.: 14/122,943

(22) PCT Filed: May 31, 2012

(86) PCT No.: PCT/EP2012/002323
§ 371 (c)(1),
(2), (4) Date: Jan. 14, 2014

(87) PCT Pub. No.: WO2012/163538
PCT Pub. Date: Dec. 6, 2012

(65) Prior Publication Data
US 2014/0127001 A1 May 8, 2014

(30) Foreign Application Priority Data
Jun. 1, 2011 (DE) .................. 10 2011 103 163

(51) Int. Cl.
| F01D 17/14 | (2006.01) |
| F02C 7/042 | (2006.01) |
| B64D 29/00 | (2006.01) |
| B64D 29/06 | (2006.01) |
| B64D 33/02 | (2006.01) |

(52) U.S. Cl.
CPC ............ *F02C 7/042* (2013.01); *B64D 29/00* (2013.01); *B64D 29/06* (2013.01); *B64D 33/02* (2013.01); *B64D 2033/0286* (2013.01); *Y02T 50/671* (2013.01)

(58) Field of Classification Search
CPC . B64D 29/00; B64D 2033/0286; F01D 17/12; F01D 17/14; F01D 17/141; F01D 17/143; F02C 7/042
USPC .......................................................... 415/126
See application file for complete search history.

(56) References Cited

U.S. PATENT DOCUMENTS

| 3,532,129 A | * | 10/1970 | Morris ............... F02C 7/045 |
| | | | 137/15.1 |
| 3,623,494 A | | 11/1971 | Poucher |
| 3,750,689 A | * | 8/1973 | Britt ................ F02C 7/042 |
| | | | 137/15.1 |

(Continued)

FOREIGN PATENT DOCUMENTS

| DE | 20 48 588 | 4/1971 |
| DE | 41 04 201 | 8/1991 |

(Continued)

OTHER PUBLICATIONS

German Search Report dated Feb. 1, 2012 from counterpart App No. 10 2011 103 163.8.

(Continued)

*Primary Examiner* — Sean J Younger
(74) *Attorney, Agent, or Firm* — Shuttleworth & Ingersoll, PLC; Timothy J. Klima

(57) ABSTRACT

An aircraft gas-turbine engine has an engine cowling-nacelle which surrounds a core engine in a tubular way, characterized in that at least one inflow-side part of the engine cowling-nacelle is telescopically movable against the flow direction.

10 Claims, 5 Drawing Sheets

(56) References Cited

U.S. PATENT DOCUMENTS

Figure 1:
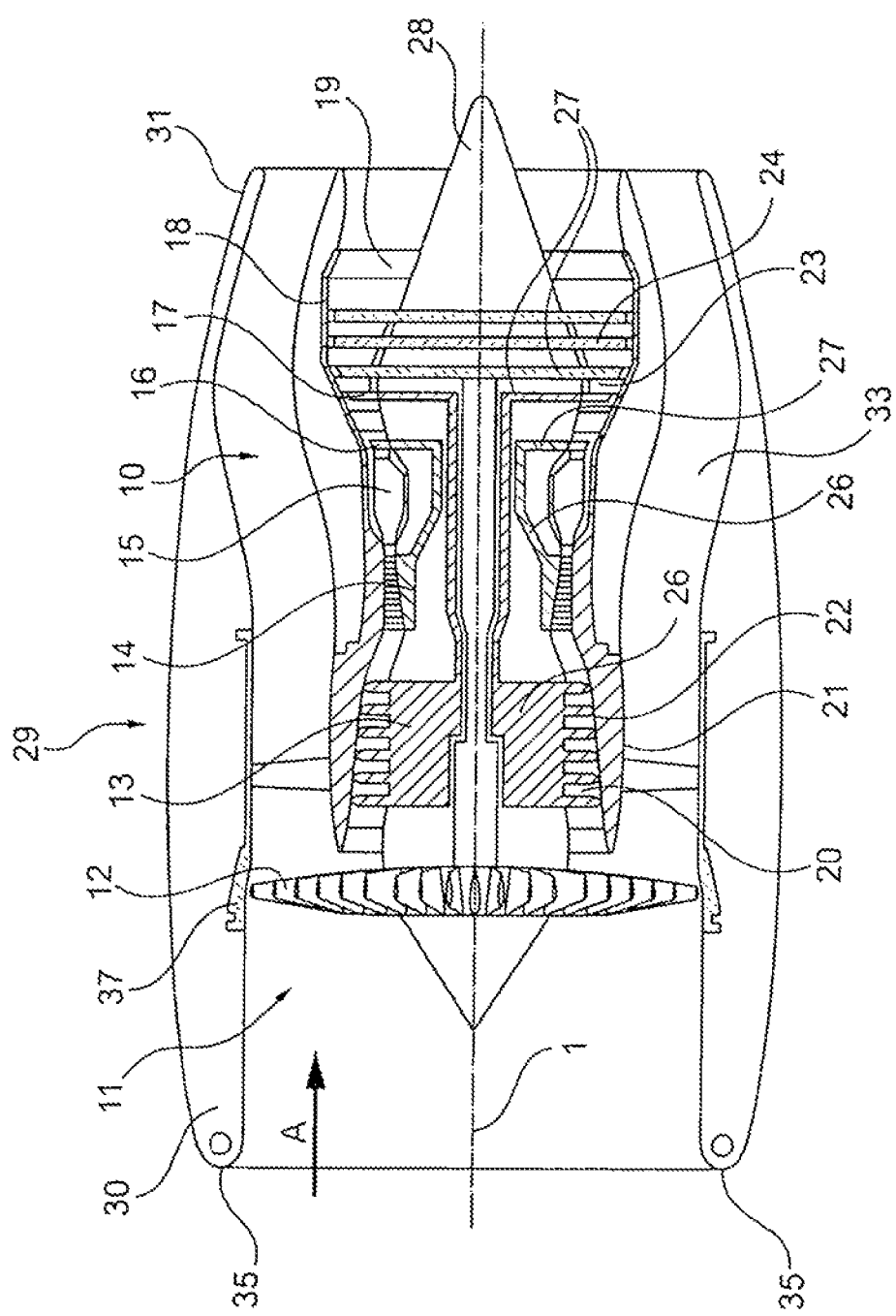

| | | | | |
|---|---|---|---|---|
| 4,047,911 | A | * 9/1977 | Krojer | F02C 7/05 244/53 B |
| 5,000,399 | A | 3/1991 | Readnour et al. | |
| 5,014,933 | A | * 5/1991 | Harm | B64D 33/02 181/215 |
| 5,177,957 | A | * 1/1993 | Grieb | B64D 33/02 244/53 B |
| 5,516,061 | A | * 5/1996 | Glasgow | B64D 33/04 239/265.29 |
| 2010/0084507 | A1 | * 4/2010 | Vauchel | B64D 29/08 244/1 N |
| 2010/0148012 | A1 | * 6/2010 | McDonough | B64D 29/00 244/53 B |
| 2011/0014044 | A1 | 1/2011 | Vauchel et al. | |
| 2011/0308634 | A1 | 12/2011 | Mouton et al. | |

FOREIGN PATENT DOCUMENTS

| | | | |
|---|---|---|---|
| EP | 2 157 299 | 2/2010 | |
| EP | 2 199 204 | 6/2010 | |
| FR | 2 942 457 | 8/2010 | |
| WO | 2009/101273 | 8/2009 | |
| WO | WO 2009101273 A1 * | 8/2009 | B64D 29/06 |

OTHER PUBLICATIONS

English translation of International Search Report dated Aug. 29, 2012 from counterpart PCT App No. PCT/EP2012/002323.

* cited by examiner

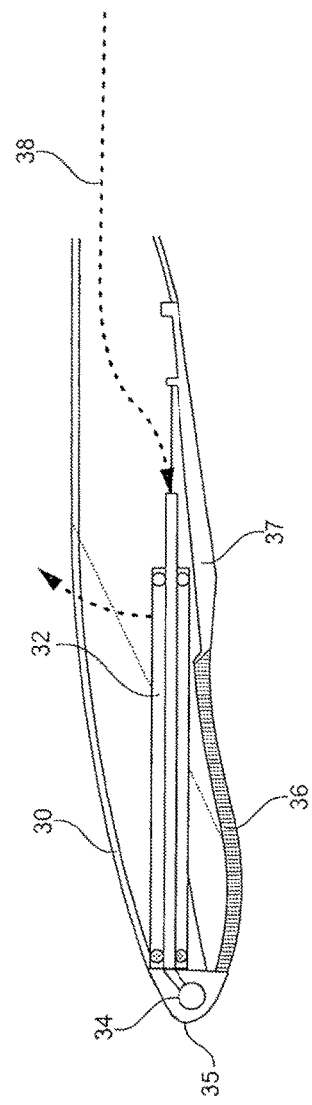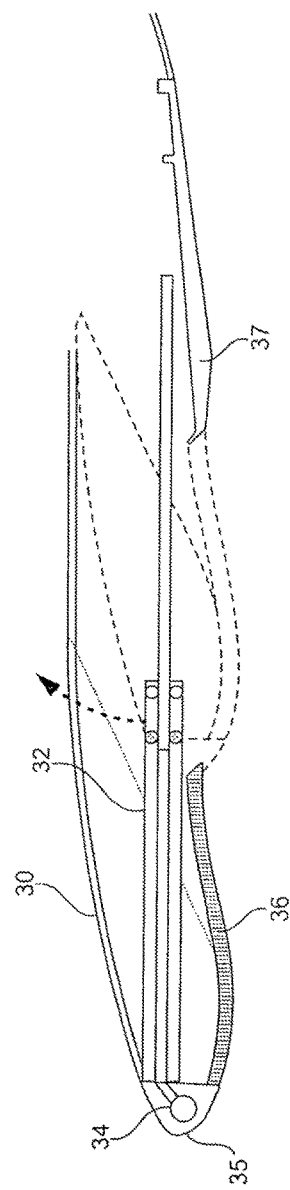

GAS-TURBINE ENGINE WITH TELESCOPE-TYPE AIR INLET OF THE ENGINE COWLING (NACELLE)

This application is the National Phase of International Application PCT/EP2012/002323 filed May 31, 2012 which designated the U.S.

This application claims priority to German Patent Application No. DE102011103163.8 filed Jun. 1, 2011, which application is incorporated by reference herein.

This invention relates to a gas-turbine engine having an engine cowling (nacelle) which surrounds the gas-turbine engine, in particular a core engine, and a bypass duct surrounding the latter.

Engine cowlings (nacelles) of aircraft gas-turbine engines include a plurality of assemblies and structural elements which are of complex design and require maintenance. They include, for example, the inflow area (air inlet), the fan casing, the thrust-reversing device and the outlet nozzle of the bypass duct. The inflow area includes here a de-icing device and acoustic damping means on its inner wall, sensors or similar elements. To perform maintenance work on the engine, it is known from the state of the art to remove individual partial areas of the engine cowling or to open them like cowls or doors. This requires a high and additional design effort, which entails a plurality of additional components. Furthermore, the maintenance effort is not inconsiderable, since a plurality of elements have to be removed or opened to provide access to the relevant assemblies. All in all, the result is also a high overall weight of the structure.

The object underlying the present invention is to provide a gas-turbine engine which, while being simply designed, easy and cost-effectively producible, affords good accessibility and good maintenance possibilities.

It is a particular object to provide a solution to the above mentioned problems by a combination of features described herein. Further advantageous embodiments will become apparent from the present description.

In accordance with the invention, it is thus provided that at least one inflow-side part of the engine cowling is telescopically movable against the flow direction. This telescopic movement is substantially in the axial direction, making it possible to provide access to important structural elements of the engine by a simple movement of the tubular inflow area.

The movability provided in accordance with the invention of the engine cowling part on the inflow side can be achieved in a simple manner, where it is particularly favourable when the inflow-side area is mounted by means of a telescopic rail guide. The latter transmits the weight of the inflow-side part, in the opened state too, to the engine structure, so that the maintenance personnel do not have to open or carry away any heavy parts. Furthermore, movability proves particularly favourable with regard to the wind forces occurring, since in comparison with doors or cowls, no additional safety measures are required.

The inflow-side part of the engine cowling in accordance with the invention can be locked by means of simple locking mechanisms in the operable state. These locking mechanisms only need to be released to permit the movement. Since the movement is aligned against the flow direction of the engine, there is no risk of the inflow-side part moving automatically during flight.

In accordance with the invention, an integrated component is thus provided which can be telescopically moved and which creates the inflow area, the incoming-flow lip and a de-icing device while affording accessibility to components of the fan cowling. Hence a single module is created which is movable with very little effort.

In accordance with the invention, the movement can be made by hand, but it is also possible to provide an auxiliary drive unit (electric or pneumatic) for that purpose.

In accordance with the invention, the result is, in addition to simple operability, a reduction in the required parts and as a consequence of this a weight reduction.

Since the inflow-side part of the engine cowling is furthermore movable as an integral module, it is possible to design the outer surface flow-optimized. The disruptions to the flow occurring in the state of the art due to cowls, operating levers or the like can therefore be avoided.

Furthermore it is particularly favourable that seals can be provided on the telescopically movable part and/or the non-movable components in order to prevent flow losses in the closed state.

Figure 4:
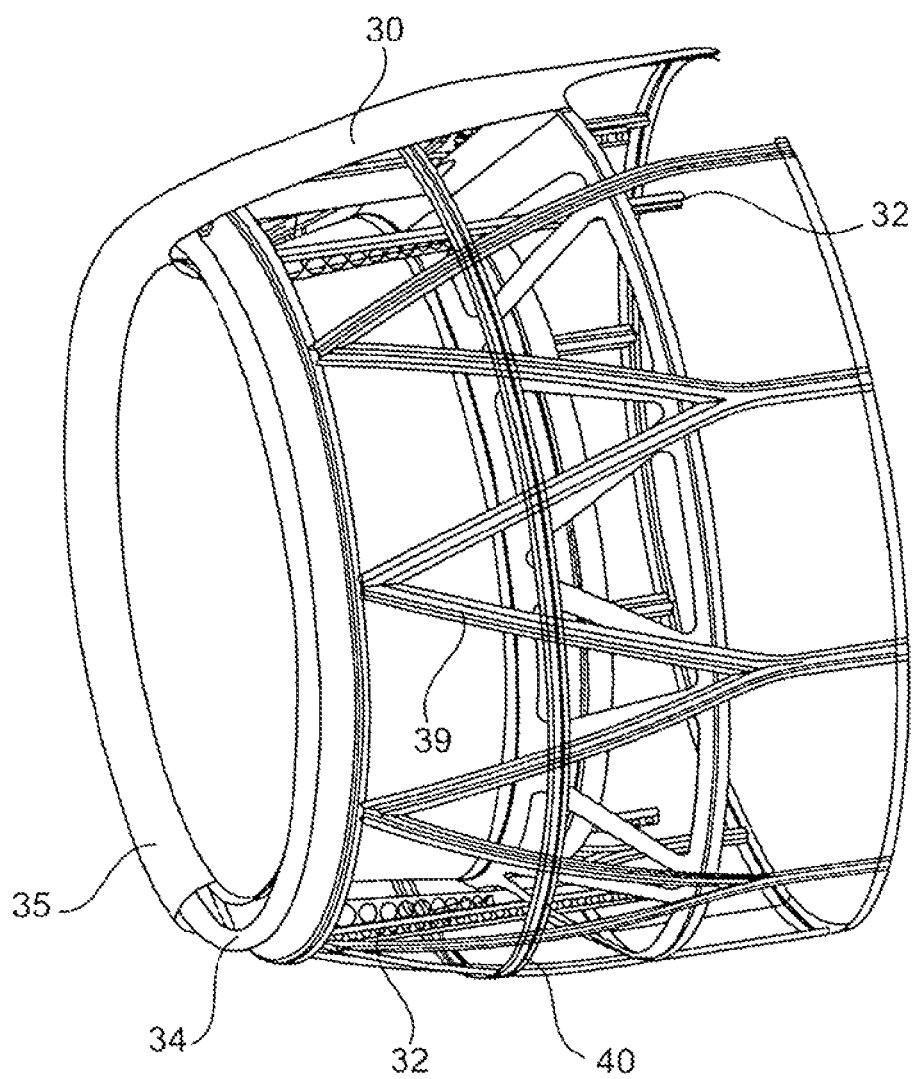
Figure 5:
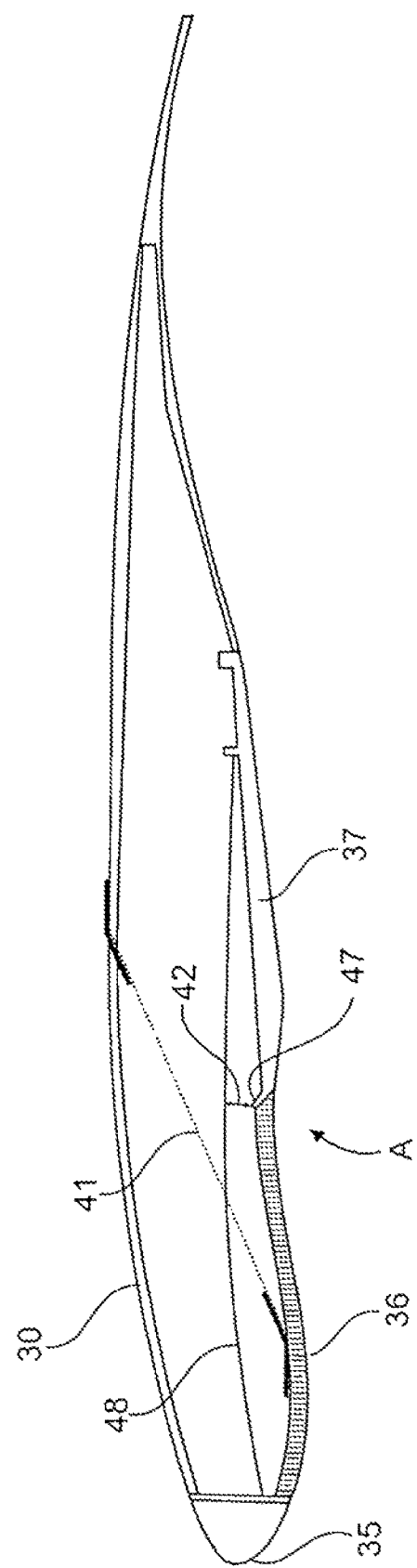
Figure 6:
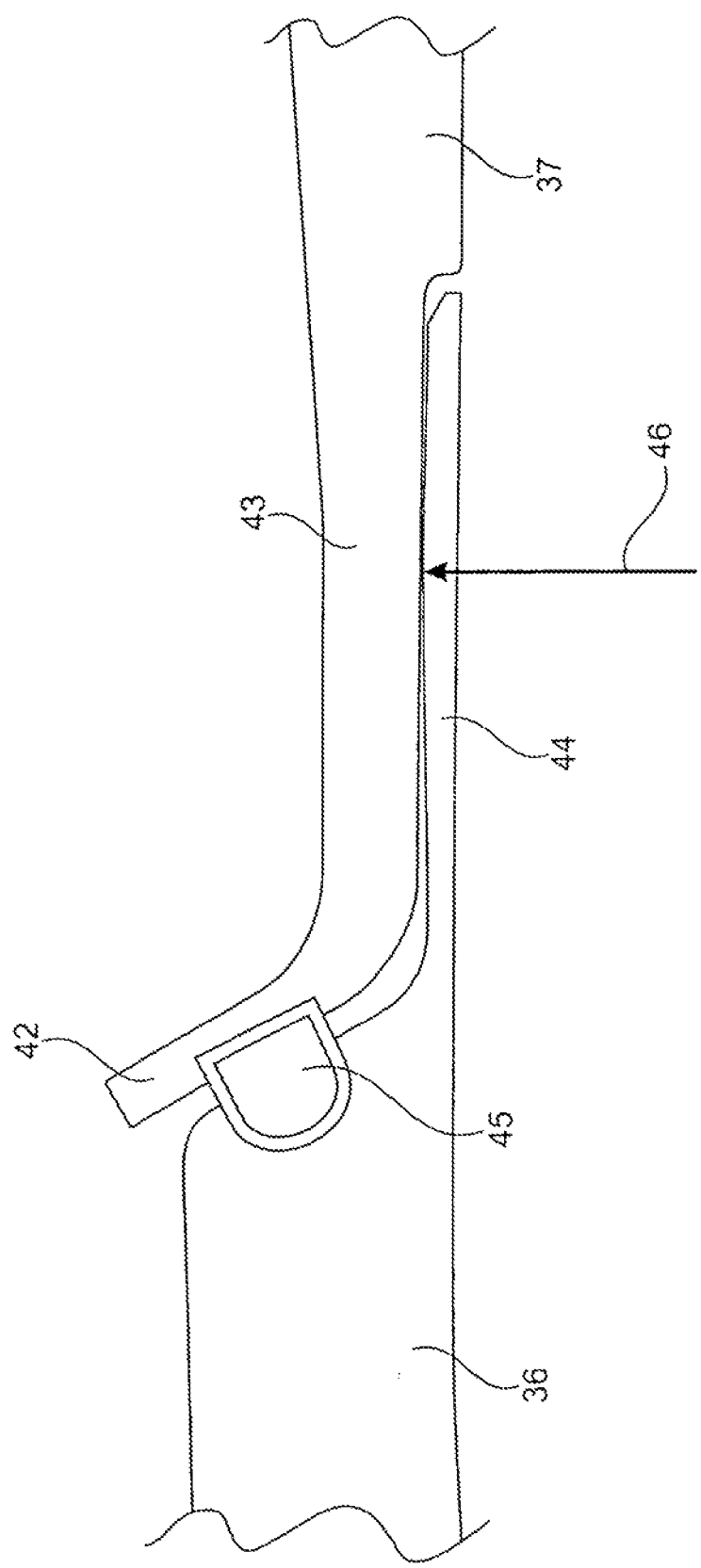

The present invention is described in the following in light of the accompanying drawing, showing an exemplary embodiment. In the drawing, FIG. 1 shows a schematic representation of a gas-turbine engine in accordance with the present invention, FIG. 2 shows a simplified partial sectional view of the telescopically movable inflow-side part of the engine cowling in the close state, FIG. 3 shows a representation, by analogy with FIG. 2, in the opened state, FIG. 4 shows a perspective partial sectional view of the inflow-side part of the engine cowling in accordance with the invention, FIG. 5 shows a sectional view, by analogy with FIGS. 2 and 3, and FIG. 6 shows an enlarged detail view of detail area A in accordance with FIG. 5.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIGS. 2 and 3 show a partial sectional view of the telescopically movable part 30 in accordance with the invention, both in the opened state (FIG. 3) and in the closed state (FIG. 2). The reference numeral 34 shows a thermal de-icing device of an incoming flow area 35 in a schematic representation. This device is designed according to the state of the art and includes for example an annular and tubular duct provided with outlet openings. The inflow-side part 30 thus forms that area of an engine cowling 29 which is at the front in the flow direction. The engine cowling 29 also includes a thrust-reversing element 31, shown only schematically in FIG. 1.

FIGS. 2 and 3 furthermore show an acoustic damping means 36 provided on the radially inner wall area of the inflow-side part 30. The reference numeral 37 indicates a bypass fan casing.

As can be seen from FIGS. 2 and 3, the inflow-side part 30 is movable by means of a telescopic rail guide 32 (see also FIG. 4). The telescopic rail guide 32 can also include means for supplying hot air 38 to the de-icing device 34. It is thus not necessary when opening the inflow-side part 30 (axial movement against the flow direction) to detach electrical, pneumatic or hydraulic connections.

FIG. 4 is a perspective partial view showing structural elements inside the inflow-side part 30. In particular, frames 39 and annular carriers 40, which increase the stability of the overall structure, can be seen.

FIG. 5 shows in a schematic view, by analogy with FIG. 2, a supporting strut 41 which transmits forces, for example applied by a bird strike to the incoming flow area 35, into the overall structure.

FIG. 6 shows in an enlarged representation the transitional area between the component 36, which represents an acoustic damping means and is at the same time part of the inlet barrel, and the bypass fan casing 37. FIG. 6 shows that the bypass fan casing 37 has an extended area 43 in the forward direction with a radially outward-facing lip 42. Matching the latter, the inlet barrel 36 (acoustic damping means) is provided with an extension 44 which is located radially inside the extended area 43. The two parts 43 and 44 thus provide a telescopic arrangement formed from two annular areas 43 and 44. In between them is a seal 45 which can be designed as a lip seal or radial seal.

The extended area 43 and the extension 44 form at their contact surface a joint-like structure with "cardanic" action (gimbal joint). To do so, the radially outer surface of the extension 44 is designed with a spherical contour 46.

As can be discerned when viewing FIGS. 5 and 6 together, the lip 42 has a distance 47 from a longitudinal member 48 in the radially outward-facing direction. The longitudinal member 48 is a solid component of the supporting structure, while the acoustic damping means (inlet barrel) together with the bypass fan casing 37 is deformed in the event of a fan defect. If a fan blade (airfoil) is hit by a bird strike, for example, this leads to a sinusoidal deformation of the components 36 and 37. The distance 47 is provided to make this deformation possible. In these cases, the seal 45 furthermore provides a dependable sealing effect, and the joint-like bracing between the extended area 43 and the extension 44 (spherical contour 46) has the effect that forces can be transmitted in the Y and Z directions.

LIST OF REFERENCE NUMERALS

1 Engine axis
10 Gas-turbine engine (core engine)
11 Air inlet
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Engine cowling (nacelle)
30 Inflow-side part of engine cowling
31 Thrust-reversing elements
32 Telescopic rail guide
33 Bypass duct
34 De-icing device
35 Incoming flow area
36 Acoustic damping means/inlet barrel
37 Bypass fan casing
38 Hot air
39 Frame
40 Annular carrier
41 Supporting strut
42 Lip
43 Extended area
44 Extension
45 Seal
46 Spherical contour
47 Distance
48 Longitudinal member

What is claimed is:

1. An aircraft gas-turbine engine comprising:
a core engine including a core engine casing,
an engine cowling spaced radially outwardly of the core engine casing and surrounding the core engine casing in a tubular manner forming a bypass duct, the engine cowling including an outer portion, an inner portion and an inflow-side part,
a fan connected to the core engine,
a bypass fan casing surrounding the fan and forming a portion of the bypass duct,
wherein the inflow-side part is tubular, extends around an entire circumference of the engine cowling, and is telescopically movable in a direction against the flow direction between a closed position and an open position,
wherein the inflow-side part includes a portion of the outer portion up to a thrust-reversing element of the gas-turbine engine and a portion of the inner portion positioned adjacent to the bypass fan casing when in the closed position,
wherein the portion of the inner portion is spaced apart from the bypass fan casing in the direction against the flow direction when in the open position.

2. The aircraft gas-turbine engine in accordance with claim 1, wherein the portion of the inner portion extends downstream of a forward portion of the bypass fan casing in the flow direction.

3. The aircraft gas-turbine engine in accordance with claim 2, and further comprising a seal positioned between the portion of the inner portion and the bypass fan casing for sealing between the portion of the inner portion and the bypass fan casing when the inflow-side part is in the closed position.

4. The aircraft gas-turbine engine in accordance with claim 3, and further comprising telescopic rail guides mounting the inflow-side part.

5. The aircraft gas-turbine engine in accordance with claim 4, wherein the telescopic rail guides provide to the inflow-side part at least one chosen from a substantially axial movement and at least a partly radial movement.

6. The aircraft gas-turbine engine in accordance with claim 2, and further comprising telescopic rail guides mounting the inflow-side part.

7. The aircraft gas-turbine engine in accordance with claim 6, wherein the telescopic rail guides provide to the inflow-side part at least one chosen from a substantially axial movement and at least a partly radial movement.

8. The aircraft gas-turbine engine in accordance with claim 1, and further comprising telescopic rail guides mounting the inflow-side part.

9. The aircraft gas-turbine engine in accordance with claim 8, wherein the telescopic rail guides provide to the inflow-side part at least one chosen from a substantially axial movement and at least a partly radial movement.

10. The aircraft gas-turbine engine in accordance with claim 1, wherein the inflow-side part is movable by hand or by an auxiliary drive unit.

* * * * *